(12) United States Patent
Ishigame et al.

(10) Patent No.: US 11,602,415 B2
(45) Date of Patent: Mar. 14, 2023

(54) ORTHODONTIC APPLIANCE

(71) Applicant: SheepMedical Co., Ltd., Tokyo (JP)

(72) Inventors: Masaru Ishigame, Tokyo (JP);
Motohiko Sugiyama, Tokyo (JP)

(73) Assignee: SHEEPMEDICAL CO., LTD., Tokyo (JP)

( * ) Notice: Subject to any disclaimer, the term of this patent is extended or adjusted under 35 U.S.C. 154(b) by 0 days.

(21) Appl. No.: 17/685,875

(22) Filed: Mar. 3, 2022

(65) Prior Publication Data
US 2022/0280267 A1 Sep. 8, 2022

(30) Foreign Application Priority Data

Mar. 4, 2021 (JP) .............................. JP2021-034577

(51) Int. Cl.
*A61C 7/10* (2006.01)
*A61C 7/36* (2006.01)

(52) U.S. Cl.
CPC . *A61C 7/10* (2013.01); *A61C 7/36* (2013.01)

(58) Field of Classification Search
CPC .................................... A61C 7/36; A61C 7/10
See application file for complete search history.

(56) References Cited

U.S. PATENT DOCUMENTS

| | | | | |
|---|---|---|---|---|
| 4,433,956 A * | 2/1984 | Witzig | ...................... | A61C 7/00 433/7 |
| 5,002,485 A * | 3/1991 | Aagesen | ................... | A61C 7/00 433/7 |
| 5,829,970 A * | 11/1998 | Yousefian | ................. | A61C 7/10 433/7 |
| 7,314,372 B2 * | 1/2008 | Belfor | ...................... | A61C 7/00 433/7 |
| 9,011,145 B2 * | 4/2015 | Hang | ....................... | A61C 7/36 433/7 |
| 10,098,711 B2 * | 10/2018 | Yousefian | ................. | A61C 7/10 |

(Continued)

FOREIGN PATENT DOCUMENTS

JP 2008-183126 A 8/2008
JP 4332641 B2 9/2009

(Continued)

OTHER PUBLICATIONS

Decision to Grant a Patent dated Oct. 12, 2021 in corresponding Japanese Patent Application No. 2021-034577 (4 pages) (2 pages English Translation).

(Continued)

*Primary Examiner* — Ralph A Lewis
(74) *Attorney, Agent, or Firm* — Staas & Halsey LLP

(57) ABSTRACT

The orthodontic appliance includes a spread plate for spreading location of right and left molars of an upper dentition portion by spreading right and left plate portions, and the right and left plate portions include plate body portions arranged respectively on the sides of the molars of the upper dentition portion and the engagement portions extending from the plate body portions to the positions each facing the vicinity of the front teeth of the upper dentition portion, and the engagement portions are configured to be engaged with the lower front teeth when the upper dentition portion and a lower dentition portion are engaged with each other.

8 Claims, 9 Drawing Sheets

(56) References Cited

U.S. PATENT DOCUMENTS 10,639,187 B2 * 5/2020 Simonetti ............... A61C 7/08

FOREIGN PATENT DOCUMENTS

JP   2019-162368 A   9/2019
WO  WO 2017/154641 A1  9/2017

OTHER PUBLICATIONS

Written Opinion including written amendment submitted to JPO immediately prior to the Decision to Grant a Patent from Office of Earlier Examination (OEE), submitted on Jul. 29, 2021, in corresponding Japanese Patent Application No. 2021-034577 (4 pages) (5 pages English Translation).
Notice of Reasons for Refusal dated Jun. 29, 2021 in corresponding Japanese Patent Application No. 2021-034577 (3 pages) (3 pages English Translation).

* cited by examiner

ORTHODONTIC APPLIANCE

CROSS REFERENCE TO RELATED APPLICATIONS

This application is based upon and claims the benefit of priority under 35 USC 119 of the prior Japanese Patent Application No. 2021-034577, filed Mar. 4, 2021, the entire contents of which are incorporated herein by reference.

BACKGROUND

1. Technical Field

The present invention relates to an orthodontic appliance for performing dental correction on lower front teeth and upper molars.

2. Related Art

Traditionally, examples of an appliance for correcting a dentition include a slow spread appliance. Such a slow spread appliance may be, for example, a spread plate type appliance. The spread plate type of the slow spread appliance includes right and left plates, wires for fixing the right and left plates to a dentition portion, and a spread screw embedded in the center of the right and left plates. By rotating the spread screw, the plates are slid to the right and left, and spread force is applied to side dentition portions (e.g., see Patent Document 1).

LIST OF DOCUMENTS

Patent Documents

Patent Document 1: Japanese Patent No. 4332641

SUMMARY

However, in the case of overbite in which bite of the front teeth is too deep, molars of the upper jaw and the lower jaw are continuously in contact with and rubbed against each other, and when bite force is too strong, there arises a problem that the molars are worn down or the molars of the upper jaw and the lower jaw are depressed (teeth depression).

To prevent the above, there has been proposed a technique in which a protruding portion is formed on the palatine side of the front teeth of a mouthpiece to be attached to the upper dentition portion, and the lower front teeth are brought into contact with the protruding portion, thereby preventing the molars of the upper jaw and the lower jaw from continuously coming into contact with and rubbing against each other. There has been desired an appliance capable of correcting the above-mentioned overbite and simultaneously correcting dentition of the upper molars.

It is an object of the present invention to provide an orthodontic appliance capable of correcting overbite and correcting dentition of upper molars in a short period of time.

To solve such problems, the present invention according to a first aspect provides an orthodontic appliance including right and left plate portions formed to be fitted to a shape in an oral cavity, and a spreading unit arranged between the right and left plate portions and configured to spread location of upper molars by spreading the right and left plate portions. Here, each of the right and left plate portions includes a plate body portion provided on a side of upper molars, and an engagement portion extending from the plate body portion to a position facing a vicinity of upper front teeth. Each of the engagement portions includes an engagement surface which is engaged with the lower front teeth when an upper dentition portion and a lower dentition portion are engaged with each other. Each of the engagement surfaces is formed flat in a state of being attached into the oral cavity and is formed in a band shape whose front-back width is a predetermined width. Further, each of the engagement surfaces is formed in a smooth arc shape without irregularities on a leading end side with respect to the upper front teeth.

Further, according to a second aspect of the present invention, in addition to the configuration of the first aspect, a guide groove capable of causing the lower front teeth to be inserted is formed in the engagement surface of each of the engagement portions.

Further, according to a third aspect of the present invention, in addition to the configuration of the first or second aspect, the engagement portions are formed thicker than the plate body portions.

Further, according to a fourth aspect of the present invention, in addition to the configuration of any one of the first to third aspects, the engagement portions are each provided with a reinforcement resin having higher strength than the plate body portions.

According to the first aspect of the present invention, the orthodontic appliance includes the spreading unit configured to spread location of the upper molars by spreading the right and left plate portions. Here, each of the right and left plate portions includes the plate body portion provided on the side of the upper molars and the engagement portion extending from the plate body portion to the position facing the vicinity of the upper front teeth. Further, the engagement portions are configured to be engaged with the lower front teeth when the upper dentition portion and the lower dentition portion are engaged with each other.

Accordingly, it is possible, by causing the upper dentition portion and the lower dentition portion to be engaged with each other with the orthodontic appliance attached into the oral cavity, to correct overbite by causing the lower front teeth to be depressed and preventing contact between the upper molars and lower molars, while correcting dentition of the upper molars in a short period of time.

Further, according to the first aspect of the present invention, a gap is formed between the upper molars and the lower molars by the lower front teeth being in contact with the engagement portions. Accordingly, it is also possible to prevent depression of the upper molars and the lower molars, while promoting extrusion of the upper molars and the lower molars which have already been depressed.

Further, according to the first aspect of the present invention, the engagement surface of each of the engagement portions is formed flat in a state of being attached into the oral cavity and is formed in the band shape whose front-back width is the predetermined width.

Accordingly, even when the lower front teeth are in a crowding state, overbite can be corrected by causing the lower front teeth to be reliably in contact with the engagement surfaces, thereby improving versatility.

According to the second aspect of the present invention, the guide groove capable of causing the lower front teeth to be inserted is formed in the engagement surface of each of the engagement portions. Accordingly, it is possible to correct, based on an inclination shape and an inclination direction of the guide groove which the lower front teeth are to be in contact with, incorrect bite such as maxillary protrusion and mandibular protrusion as well as overbite.

According to the third aspect of the present invention, since the engagement portions are formed thicker than the plate body portions, the rigidity of the engagement portions requiring higher strength than the plate portion body portions can be increased and durability can be improved.

Further, according to the fourth aspect of the present invention, the engagement portions are each provided with the reinforcement resin having higher strength than the plate body portions. Accordingly, it is possible to increase rigidity and improve durability without unnecessarily increasing thickness of the engagement portions and without unnecessarily increasing weight of the engagement portions.

DETAILED DESCRIPTION

Hereinafter, embodiments of the present invention will be described. In each of the following embodiments, description will be provided on an example in which a spread plate as an orthodontic appliance of each embodiment is attached to an upper dentition portion in an oral cavity.

First Embodiment of Present Invention

FIGS. 1 to 6 show a first embodiment of the present invention.

Figure 1:
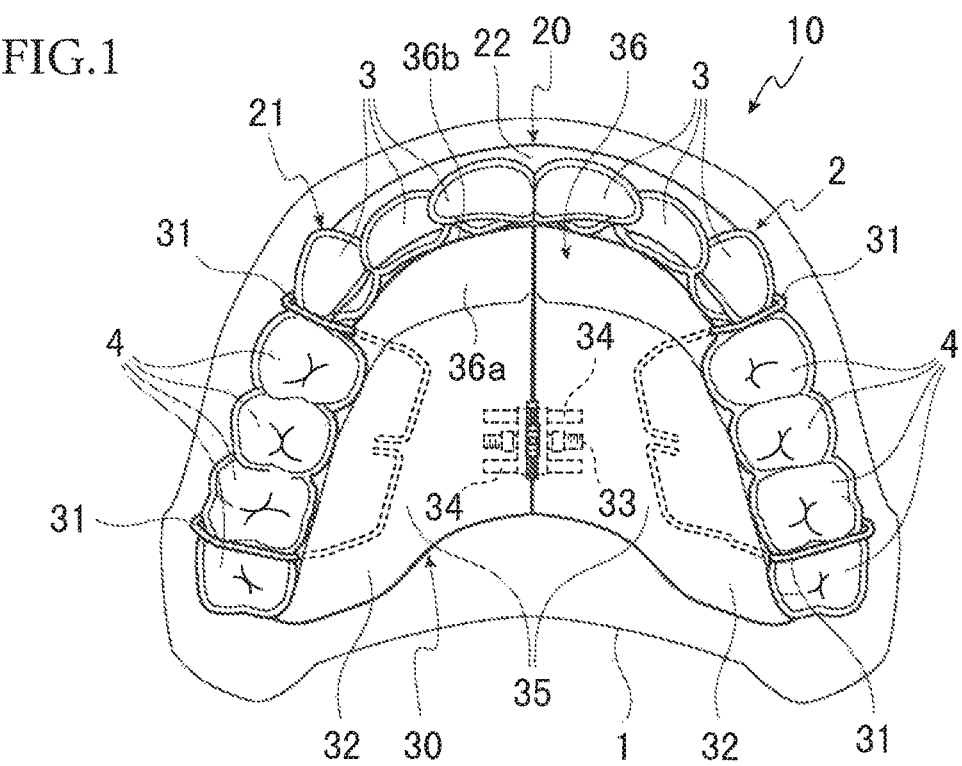
FIG. 1 is a bottom view showing a state in which an orthodontic appliance according to a first embodiment of the present invention is attached to an upper dentition portion.
Figure 2:
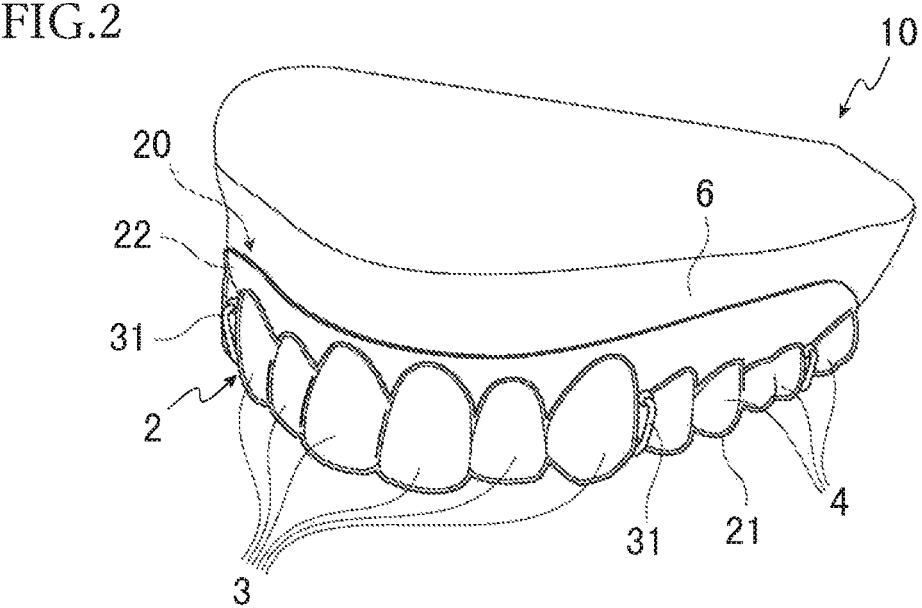
FIG. 2 is a perspective view showing a state in which the orthodontic appliance according to the first embodiment is attached to the upper dentition portion.
Figure 3:
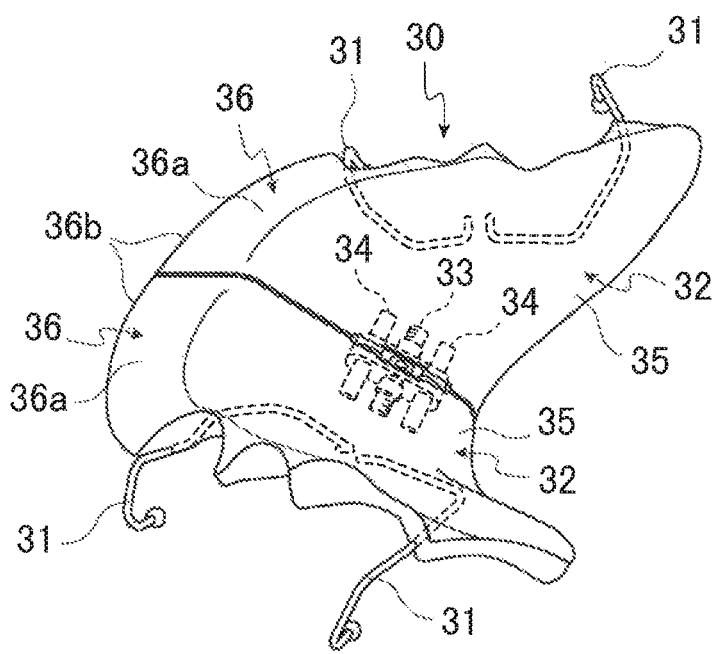
FIG. 3 is a perspective view showing a spread plate of the orthodontic appliance according to the first embodiment.
Figure 4:
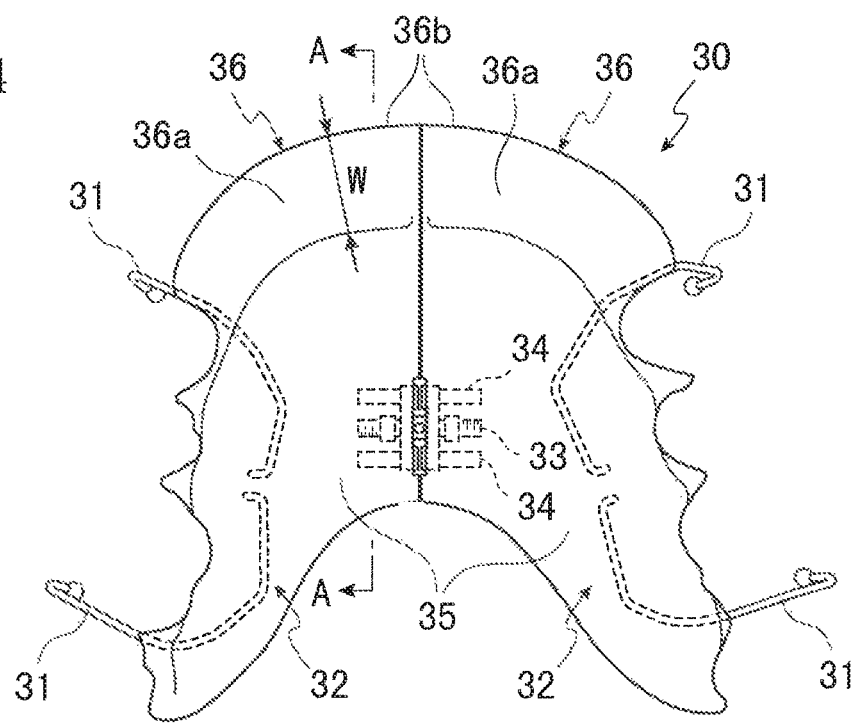
FIG. 4 is a bottom view showing the spread plate of the orthodontic appliance according to the first embodiment.
Figure 5:
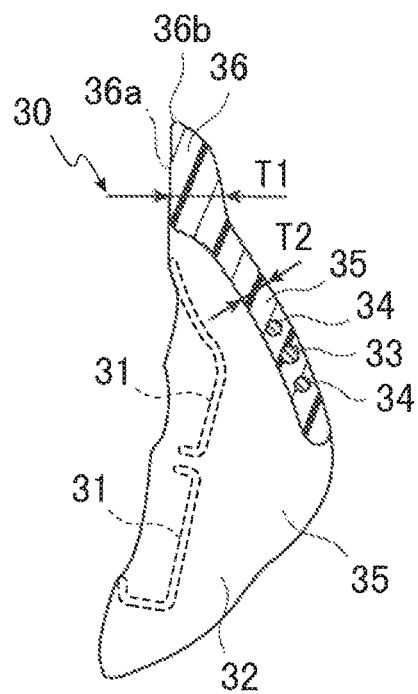
FIG. 5 is a sectional view at line A-A in FIG. 4.
Figure 6:
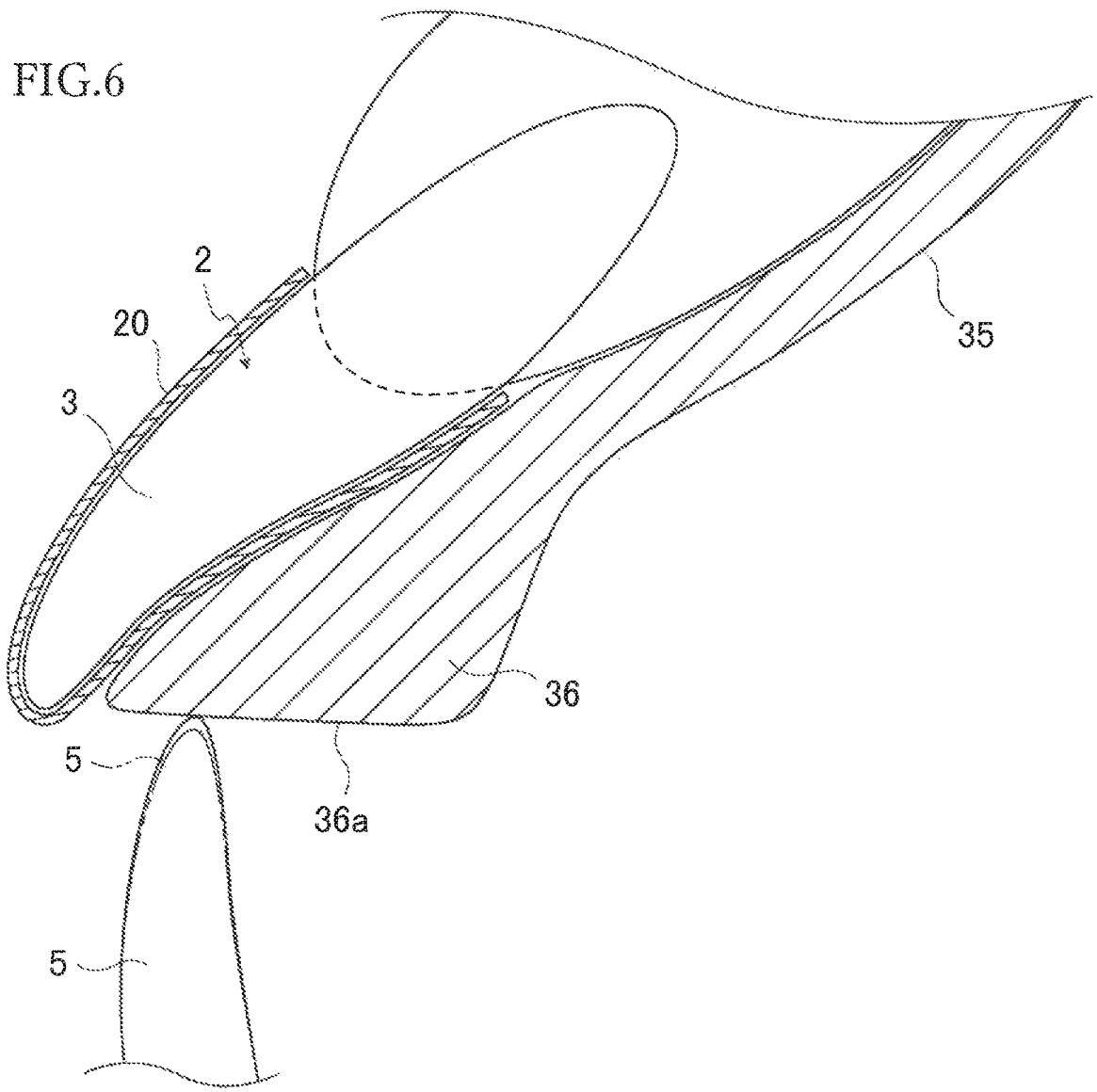
FIG. 6 is an enlarged sectional view showing effects of the spread plate of the orthodontic appliance according to the first embodiment.

FIG. 1 is a bottom view showing a state in which an orthodontic appliance according to the first embodiment of the present invention is attached to an upper dentition portion. FIG. 2 is a perspective view showing a state in which the orthodontic appliance according to the first embodiment is attached to the upper dentition portion. FIG. 3 is a perspective view showing a spread plate of the orthodontic appliance according to the first embodiment. FIG. 4 is a bottom view showing the spread plate of the orthodontic appliance according to the first embodiment. FIG. 5 is a sectional view at line A-A in FIG. 4. FIG. 6 is an enlarged sectional view showing effects of the spread plate of the orthodontic appliance according to the first embodiment.

In each of the following embodiments, in a state in which the orthodontic appliance is inserted into the oral cavity and attached to the upper dentition portion, a side toward incisors and cuspids is defined as a front side, a side toward molars is defined as a back side, and a left side and a right side with respect to the incisors and cuspids are defined as a left side and a right side, respectively In the following, the right and left central incisors, the right and left lateral incisors, and the right and left cuspids will be referred to as front teeth when collectively described. Further, first and second premolars on the right and left and the first to third molars on the right and left are referred to as molars when collectively described.

As shown in FIGS. 1 and 2, an orthodontic appliance 10 of the present embodiment is attached to an upper dentition portion 2 in an oral cavity 1 and the upper dentition portion 2 and a lower dentition portion are engaged with each other while the lips are closed, thereby correcting overbite and correcting dentition of molars of the upper dentition portion 2 by spreading the molars laterally in a short period of time. The orthodontic appliance 10 of the present embodiment is, for example, a spread plate 30 to be attached from above a mouthpiece 20.

The mouthpiece 20 used in the present embodiment is a molded article (aligner) which is a transparent thin piece and is molded into a shape that gradually moves the dentition in a direction to be corrected, that is, that gradually moves individual teeth in a direction to be aligned. The mouthpiece 20 is prepared in a plurality of stages, and corrective treatment is advanced by periodically replacing the mouthpiece 20.

The mouthpiece 20 is a plastic mouthpiece formed so as to cover all the teeth of the upper dentition portion 2, that is, the front teeth (upper front teeth) 3 and the molars (upper molars) 4 of the upper dentition portion 2, and is transparent and has hardness to maintain a predetermined shape by covering the front teeth 3 and the molars 4. As shown in FIG. 2, the mouthpiece 20 has a body portion 21 formed in a shape along a dental arch (arch) of the upper dentition portion 2 to cover and hold crown portions of the front teeth 3 and the molars 4, and a gum portion 22 located from the body portion 21 to a gum 6 side.

As shown in FIGS. 1, 3, and 4, the spread plate 30 includes right and left fixing wires 31, 31, right and left plate portions 32, 32, and a spreading screw 33. Each of the right and left fixing wires 31, 31 has a hook-shaped tip. The spread plate 30 is configured to spread location of the molars 4 of the upper dentition portion 2 by spreading the right and left plate portions 32, 32.

On each of the right and left sides, the fixing wire 31 is hooked from above the mouthpiece 20 at positions corresponding to a position between the crown portions of the front teeth 3 and the molars 4 and a position between the crown portions of the molars 4. That is, the right and left fixing wires 31, 31 are hooked on the mouthpiece 20, respectively on both the right and left sides, at the position between the crown portions of the front teeth 3 and the molars 4 and the position between the crown portions of the molars 4.

Each of the right and left plate portions 32, 32 is made of a resin such as an epoxy resin, an acrylic resin, an urethane resin, a cyanoacrylate, and a polyurethane resin, and is molded so as to fit a palate shape in the oral cavity 1. The right and left fixing wires 31, 31 are arranged at the right and left plate portions 32, 32, respectively. Specifically, the right and left fixing wires 31, 31 are fixed by being embedded in the right and left plate portions 32, 32 respectively in most portions except for portions hooked, respectively on both the right and left sides, at the position between the crown portions of the front teeth 3 and the molars 4 of the upper dentition portion 2 and the position between the crown portions of the molars 4. The right and left plate portions 32, 32 are formed such that the outer peripheral edges on the crown portion sides of the right and left molars 4 of the upper dentition portion 2 follow the shape of the corresponding crown portion on the inner side.

The spreading screw 33 constitutes a spreading unit of the present embodiment, is made of metal, and is arranged between the right and left plate portions 32, 32. The spreading screw 33 is rotated using, for example, a dedicated rotation tool to apply a force to spread location of the right and left molars 4 via the right and left plate portions 32, 32 and the right and left fixing wires 31, 31. Guide portions 34, 34 are arranged on both sides of the spreading screw 33. The guide portions 34, 34 guide the right and left plate portions 32, 32 so as to spread while maintaining the same plane when the spreading screw 33 is rotated. The right and left plate portions 32, 32 are formed substantially continuously in contact with each other before the spreading screw 33 is rotated.

Here, in the present embodiment, an example in which one spreading screw 33 is arranged at the right and left plate portions 32, 32 has been described, but the present invention is not limited thereto, and two spreading screws 33 may be arranged at the right and left plate portions 32, 32 at a predetermined interval. Further, examples of arrangement of the spreading screw 33 include a pattern of arranging one between the right and left first premolars, a pattern arranging one between the right and left second premolars, a pattern of arranging one between the right and left first molars, and a pattern of arranging one each between the right and left first premolars and between the right and left first molars. Thus, the location and the number of the spreading screws 33 are determined according to which portions of the teeth are to be spread.

Each of the right and left plate portions 32, 32 includes a plate body portion 35 arranged on a side to the corresponding molar 4 of the upper dentition portion 2, and an engagement portion 36 extending from the plate body portion 35 to a position facing the vicinity of the corresponding front teeth 3 of the upper dentition portion 2. The engagement portions 36, 36 are configured to be engaged with lower front teeth 5 shown in FIG. 6 when the upper dentition portion 2 and the lower dentition portion are engaged with each other while the lips are closed.

As shown in FIG. 5, the engagement portions 36, 36 are formed thicker than the plate body portions 35, 35. That is, the engagement portion 36 is formed to have thickness T1 larger than thickness T2 of the plate body portion 35. As shown in FIGS. 5 and 6, engagement surfaces 36a, 36a are formed on the engagement portions 36, 36, respectively, formed flat in a state of being attached into the oral cavity 1, formed in a curved shape along the dentition shape of the lower front teeth 5, and formed in a band shape whose front-back width is a predetermined width W as shown in FIG. 4. The predetermined width W is such a width that all the dentition of the lower front teeth 5 are engaged even when the dentition shape of the lower front teeth 5 is in a crowding state. The engagement surfaces 36a, 36a each have a fan shape and are formed in a substantially concentric arc shape.

The engagement portions 36, 36 extend to positions, on the mouthpiece 20, where leading ends 36b, 36b thereof face the vicinity of the right and left front teeth 3 of the upper dentition portion 2, respectively. That is, the engagement portions 36, 36 extend to the positions in the vicinity where the leading ends 36b, 36b thereof are not in contact with the right and left front teeth 3 of the upper dentition portion 2, respectively.

Next, the effects of the orthodontic appliance 10 of the present embodiment will be described.

First, in the present embodiment, the mouthpiece 20 is attached so as to cover the front teeth 3 and the molars 4 of the upper dentition portion 2 with the body portion 21. Next, on each of the right and left sides, the fixing wire 31 is hooked from above the mouthpiece 20 at positions corresponding to a position between the crown portions of the front teeth 3 and the molars 4 and a position between the crown portions of the molars 4, thereby attaching the plate body portions 35, 35 of the spread plate 30 to the right and left crown portions of the molars 4 of the mouthpiece 20, respectively.

At this time, the engagement portions 36, 36 of the spread plate 30 are attached as extending respectively from the plate body portions 35, 35 to positions facing the vicinities of the right and left front teeth 3 of the upper dentition portion 2.

The spread plate 30 of the present embodiment is attached for at least 8 hours a day, mainly during sleep, weekends, and holidays. When the upper dentition portion 2 and the lower dentition portion are engaged with each other while the lips are closed as shown in FIG. 6, the lower front teeth 5 are in contact with and engaged with the engagement surfaces 36a, 36a of the engagement portions 36, 36 to be engaged with the spread plate 30.

At this time, the plate body portions 35, 35 and the engagement portions 36, 36 of the spread plate 30 are in contact with the entire palate. Therefore, even if the lower front teeth 5 are in contact with the engagement surfaces 36a, 36a of the engagement portions 36, 36 and a high-strength pressing force is applied to the engagement portions 36, 36, the spread plate 30 can be supported by the entire palate.

The lower front teeth 5 are continuously in contact and engaged as described above and thus the lower front teeth 5 are forcibly depressed (teeth depression), thereby shallowing bite thereof against the front teeth 3 of the upper dentition portion 2. As a result, overbite can be corrected. Further, with the spread plate 30, by rotating the spreading screw 33, the plate body portions 35, 35 are slid to the right and left, the dentition of the right and left molars 4 of the upper dentition portion 2 can be spread laterally in a short period of time, and the dentition of the right and left molars 4 can be corrected.

Further, according to the spread plate 30 of the present embodiment, since a gap is formed between the molars 4 of the upper dentition portion 2 and the molars of the lower dentition portion by the lower front teeth 5 being in contact with the engagement portion 36, the depression of the molars 4 of the upper dentition portion 2 and the molars of the lower dentition portion can be prevented, while promoting extrusion (movement of teeth in an incisal edge direction (in a direction toward tooth tip)) of the molars 4 of the upper dentition portion 2 and the molars of the lower dentition portion which have already been depressed.

As described above, the orthodontic appliance 10 of the present embodiment includes the spread plate 30 for spreading location of the right and left molars 4 of the upper dentition portion 2 by spreading the right and left plate portions 32, 32, and the right and left plate portions 32, 32 include the plate body portions 35, 35 arranged respectively on the sides of the molars 4 of the upper dentition portion 2 and the engagement portions 36, 36 extending from the plate body portions 35, 35 to the positions each facing the vicinity of the front teeth 3 of the upper dentition portion 2, and the engagement portions 36, 36 are configured to be engaged with the lower front teeth 5 when the upper dentition portion 2 and the lower dentition portion are engaged with each other while the lips are closed. Accordingly, it is possible, by causing the upper dentition portion 2 and the lower dentition portion to be engaged with each other with the orthodontic appliance 10 attached into the oral cavity 1, to correct overbite by causing the lower front teeth 5 to be depressed and preventing contact between the molars 4 of the upper dentition portion 2 and the lower molars (not shown), while correcting dentition of the molars 4 of the upper dentition portion 2 in a short period of time.

Further, according to the orthodontic appliance 10 of the present embodiment, since a gap is formed between the molars 4 of the upper dentition portion 2 and the molars of the lower dentition portion by the lower front teeth 5 being in contact with the engagement portion 36, the depression of the molars 4 of the upper dentition portion 2 and the molars of the lower dentition portion can be prevented, while promoting extrusion of the molars 4 of the upper dentition portion 2 and the molars of the lower dentition portion which have already been depressed.

Further, according to the orthodontic appliance 10 of the present embodiment, the engagement surfaces 36a, 36a of the engagement portions 36, 36 are formed flat in a state of being attached into the oral cavity 1, formed in a curved shape along the dentition shape of the lower front teeth 5, and formed in a band shape whose front-back width is a predetermined width. Accordingly, even when the lower front teeth 5 are in a crowding state, overbite can be corrected by causing the lower front teeth 5 to be depressed as being reliably in contact with the engagement surfaces 36a, 36a, thereby improving versatility.

Further, according to the orthodontic appliance 10 of the present embodiment, since the engagement portions 36, 36 are formed thicker than the plate body portions 35, 35, the rigidity of the engagement portions 36, 36 requiring higher strength than the plate body portions 35, 35 can be increased and durability can be improved.

In the orthodontic appliance 10 of the present embodiment, an example in which each of the engagement portions 36, 36 is integrally molded with the corresponding plate body portion 35 has been described. However, the present invention is not limited thereto, and a reinforcement resin (not shown) having higher strength than the plate body portion 35 may be arranged in the engagement portion 36. As a material of the reinforcement resin, for example, any one of resins such as an epoxy resin, an acrylic resin, an urethane resin, a cyanoacrylate, or a polyurethane resin is selected. Accordingly, it is possible to increase rigidity and improve durability without unnecessarily increasing thickness of the engagement portions 36, 36 and without unnecessarily increasing weight of the engagement portions 36, 36.

Further, in the orthodontic appliance 10 of the present embodiment, the engagement portions 36, 36 may be arranged in a detachably attachable manner with respect to the plate body portions 35, 35. In this case, for example, a plurality of protrusions are integrally formed on the lower surface sides of the plate body portions 35, 35, and a plurality of fitting recesses to be fitted into the projections are formed in the engagement portions 36, 36 so as to be detachably attachable. With such a configuration, by replacing the engagement portions 36, 36 with ones each having a different shape and a material in accordance with treatment progress, usability of the orthodontic appliance 10 is improved, and versatility can be enhanced. Here, the attachment/detachment mechanism may have a structure other than a combination of the protrusions and the fitting recesses.

First Modification of First Embodiment of Present Invention

Figure 7:
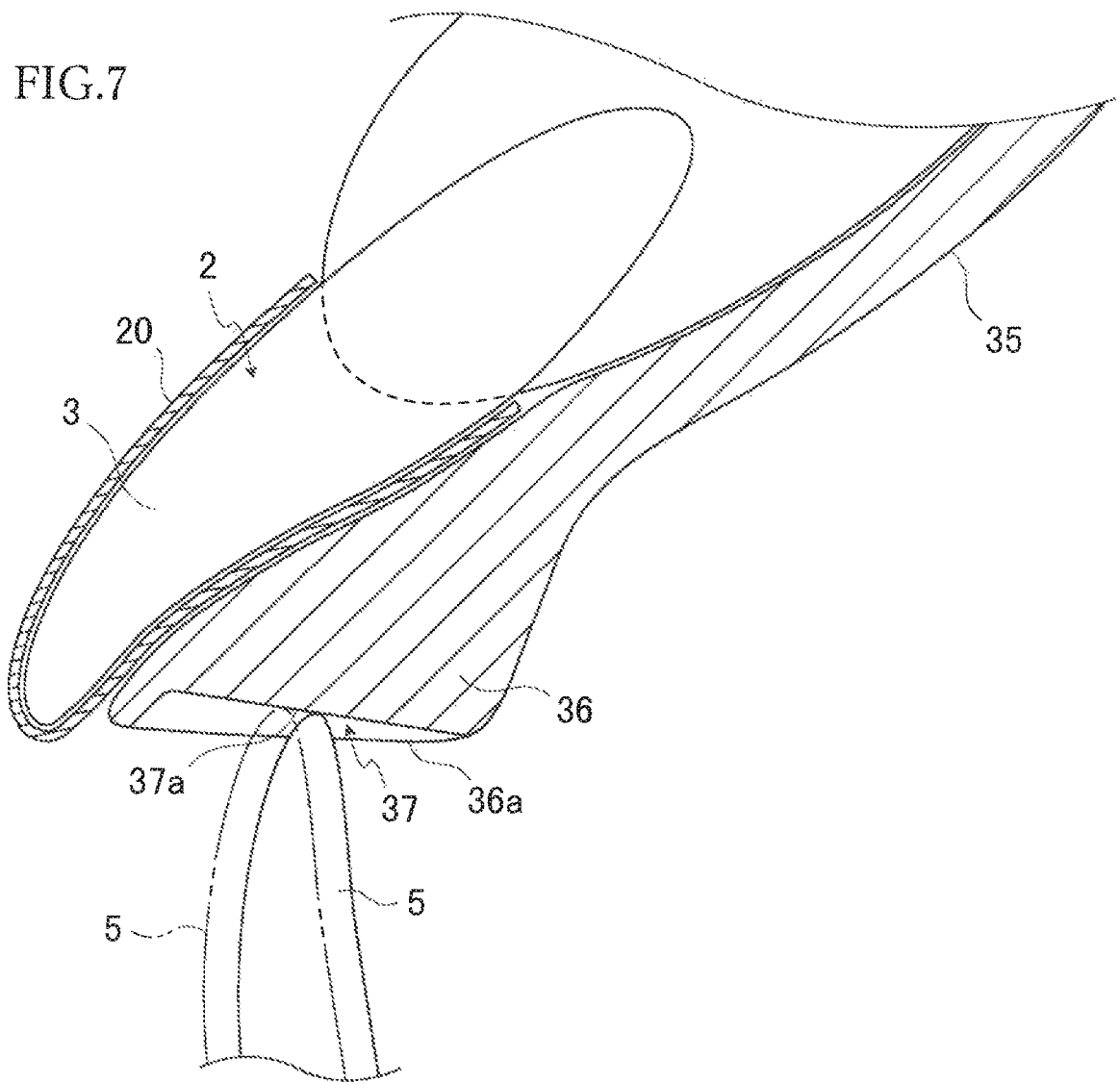
FIG. 7 is an enlarged sectional view showing a first modification of the orthodontic appliance according to the first embodiment.

FIG. 7 is an enlarged sectional view showing a first modification of the orthodontic appliance according to the first embodiment. In the following embodiments or modifications, description will be provided on different configurations and effects as assigning the same reference numerals to the same or corresponding parts as those of the first embodiment.

As shown in FIG. 7, in the present modification, a frontward guide groove 37 into which the entire lower front teeth 5 can be inserted is formed in the engagement surface 36a of the engagement portion 36. The frontward guide groove 37 is formed over substantially the entire length of the predetermined width W of the front-rear width of the engagement surface 36a. The frontward guide groove 37 is formed with an inclined surface 37a gradually inclined so as to gradually become deeper toward the front teeth 3 of the upper dentition portion 2.

Therefore, in the present modification, when the spread plate 30 is attached into the oral cavity 1 and the upper dentition portion 2 and the lower dentition portion are engaged with each other while the lips are closed, the lower front teeth 5 are in contact and engaged with the inclined surface 37a of the frontward guide groove 37. Then, the lower front teeth 5 are guided along the inclined surface 37a toward the front teeth 3 of the upper dentition portion 2 while being forcibly depressed in the same manner as in the first embodiment. As a result, overbite and overjet fall within predetermined ranges, and overbite and maxillary protrusion can be corrected.

As described above, according to the present modification, the frontward guide groove 37 into which the lower front teeth 5 can be inserted is formed on the engagement surface 36a of the engagement portion 36, and the inclined surface 37a inclined toward the front teeth 3 of the upper dentition portion 2 is formed in the frontward guide groove 37. Thus, it is possible to correct not only overbite but also maxillary protrusion.

In the present modification, the inclination angle of the inclined surface 37a of the frontward guide groove 37 is set to an angle at which the effect of depressing the lower front teeth 5 and the effect of moving the lower front teeth 5 toward the front teeth 3 are most obtained, for example, in a range of 5 to 15 degrees. Here, when the inclination angle of the inclined surface 37a is less than 5 degrees, although the effect of depressing the lower front teeth 5 is high, the effect of moving toward the front teeth 3 is low. Further, when the inclination angle of the inclined surface 37a exceeds 15 degrees, although the effect of depressing the lower front teeth 5 is low, the effect of moving toward the front teeth 3 is high.

Second Modification of First Embodiment of
Present Invention

Figure 8:
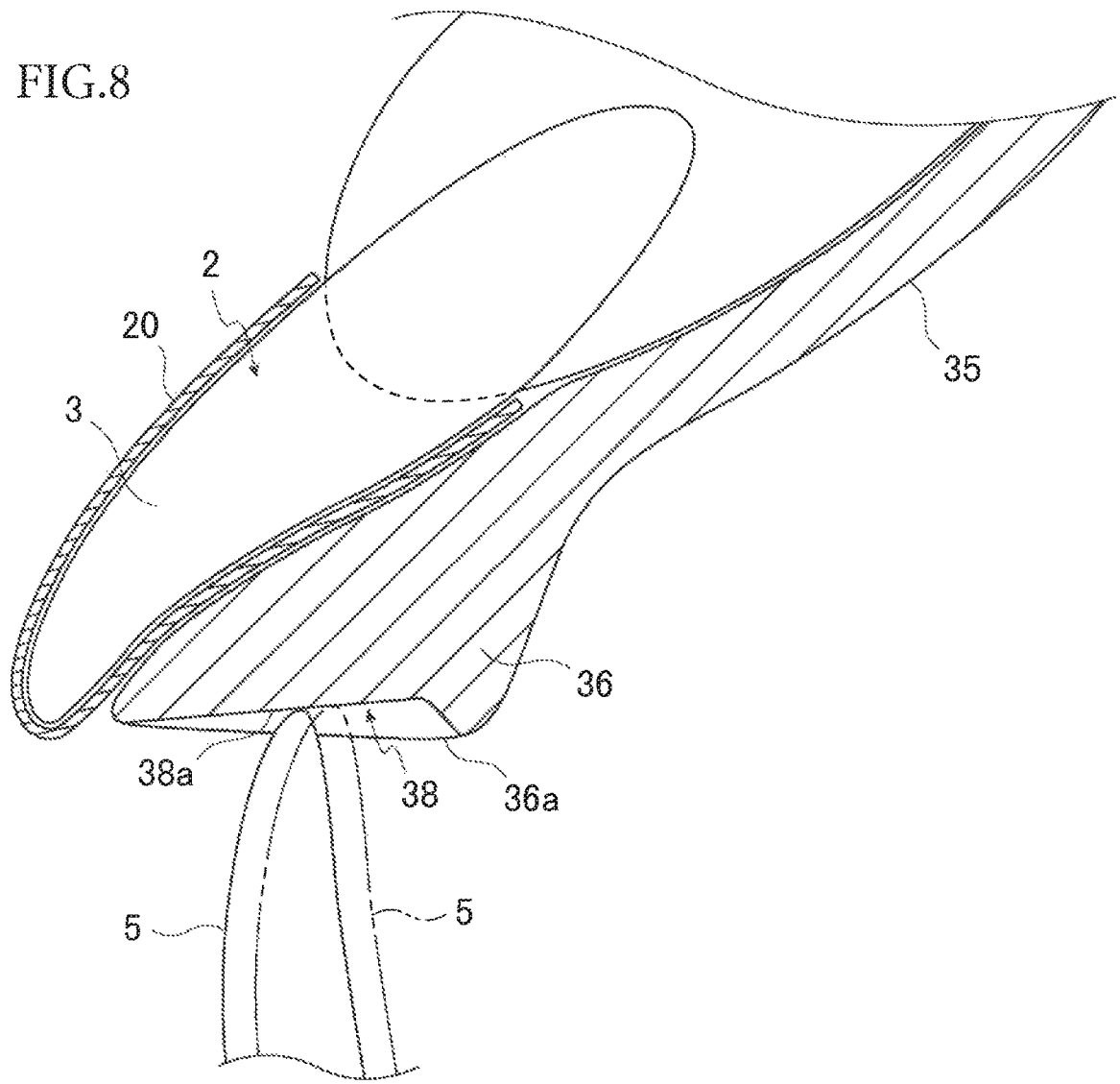
FIG. 8 is an enlarged sectional view showing a second modification of the orthodontic appliance according to the first embodiment.

FIG. 8 is an enlarged sectional view showing a second modification of the orthodontic appliance according to the first embodiment.

As shown in FIG. 8, in the present modification, a backward guide groove 38 into which the entire lower front teeth 5 can be inserted is formed in the engagement surface 36a of the engagement portion 36. The backward guide groove 38 is formed over substantially the entire length of the predetermined width W of the front-rear width of the engagement surface 36a. The backward guide groove 38 is formed with an inclined surface 38a gradually inclined so as to gradually become deeper toward the corresponding plate body portion 35.

Therefore, in the present modification, when the spread plate 30 is attached into the oral cavity 1 and the upper dentition portion 2 and the lower dentition portion are engaged with each other while the lips are closed, the lower front teeth 5 are in contact and engaged with the inclined surface 38a of the backward guide groove 38. Then, the lower front teeth 5 are guided along the inclined surface 38a toward the plate body portion 35 while being forcibly depressed. As a result, overbite and overjet fall within predetermined ranges, and overbite and mandibular protrusion can be corrected.

As described above, according to the present modification, the backward guide groove 38 into which the lower front teeth 5 can be inserted is formed on the engagement surface 36a of the engagement portion 36, and the inclined surface 38a inclined toward the plate body portion 35 is formed in the backward guide groove 38. Thus, it is possible to correct not only overbite but also mandibular protrusion.

In the present modification, similarly to the first modification, the inclination angle of the inclined surface 38a of the backward guide groove 38 is set to an angle at which the effect of depressing the lower front teeth 5 and the effect of moving the lower front teeth 5 toward the plate body portion 35 are most obtained, for example, in a range of 5 to 15 degrees. Here, when the inclination angle of the inclined surface 38a is less than 5 degrees, although the effect of depressing the lower front teeth 5 is high, the effect of moving toward the plate body portion 35 is low. Further, when the inclination angle of the inclined surface 38a exceeds 15 degrees, although the effect of depressing the lower front teeth 5 is low, the effect of moving toward the plate body portion 35 is high.

Second Embodiment of Present Invention

Figure 9:
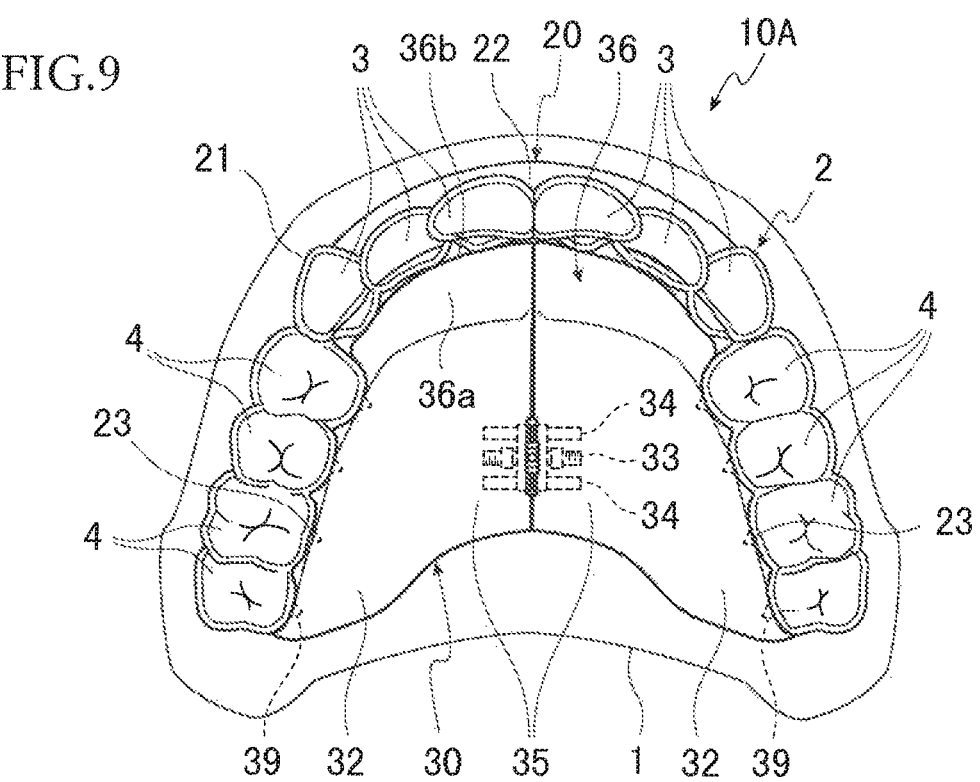
FIG. 9 is a bottom view showing a state in which an orthodontic appliance according to a second embodiment of the present invention is attached to an upper dentition portion.

FIG. 9 shows a second embodiment of the present invention. FIG. 9 is a bottom view showing a state in which an orthodontic appliance according to a second embodiment of the present invention is attached to an upper dentition portion.

As shown in FIG. 9, the orthodontic appliance 10A of the present embodiment is configured such that, instead of locking the spread plate 30 to the mouthpiece 20 using the right and left fixing wires 31, 31, fitting recesses 39 formed in the spread plate 30 are fitted into and locked to protrusions 23 formed in the mouthpiece 20.

Specifically, in the orthodontic appliance 10A of the present embodiment, the mouthpiece 20 attached to the front teeth 3 and the molars 4 of the upper dentition portion 2 is provided with the protrusions 23 as locked portions on the right and left inner sides corresponding to regions of the molars 4, that is, on the lingual sides. The protrusions 23 are integrally molded to have a length of at least 1 mm by, for example, the body portion 21 of the mouthpiece 20 and plastic. Each of the protrusions 23 is formed in a conical shape so as to protrude toward the lingual side.

Note that the protrusions 23 may be formed separately from the body portion 21 and bonded to the body portion 21. Here, the protrusions 23 are each formed in a conical shape. However, not limited to this shape, the protrusions 23 may have any shape as long as being capable of being locked to the right and left plate portions 32, 32, for example, a pyramid shape, a truncated cone shape, a truncated pyramid shape, a cylindrical shape, or a semi-cylindrical shape or a hemispherical shape whose flat surface sides are bonded to the right and left inner sides of the mouthpiece 20 corresponding to the molars 4.

On the other hand, the spread plate 30 is provided with fitting recesses 39 as right and left locking portions which are fitted to and locked to the right and left protrusions 23, respectively.

In the present embodiment, the fitting recesses 39 are configured to be locked as being fitted to the protrusions 23. However, not limited thereto, any configuration may be employed as long as fitting and locking are provided therebetween.

As described above, according to the orthodontic appliance 10 of the present embodiment, the protrusions 23 are provided on the right and left inner sides of the mouthpiece 20, and the right and left fitting recesses 39 to be engaged respectively with the right and left protrusions 23 are provided on the spread plate 30. Accordingly, the spread plate 30 can be easily attached to and detached from the mouthpiece 20.

Further, according to the orthodontic appliance 10 of the present embodiment, since the spread plate 30 is locked on the inner side of the right and left crown portions of the region where the mouthpiece 20 is attached, aesthetics can be improved.

In the present embodiment, description has been provided on an example in which a plurality of protrusions 23 as the locked portions are arranged respectively on the right and left inner sides of the mouthpiece 20 corresponding to the regions of the molars 4. However, not limited thereto, the protrusions 23 may be directly attached by an adhesive to the inner sides of the crown portions of the right and left molars 4, that is, the lingual sides. Since the protrusion 23 becomes an obstacle when the mouthpiece 20 is to be attached, it is desirable to form an opening in advance at regions corresponding to the protrusions 23.

OTHER EMBODIMENTS OF PRESENT INVENTION

While the embodiments of the present invention have been described, the embodiments have been presented by way of example and are not intended to limit the scope of the invention. The embodiments can be implemented in various other forms, and various omissions, substitutions, modifications, and combinations can be made without departing from the spirit of the invention. The embodiments and the modifications thereof are included in the scope and the spirit of the invention, and are also included in the invention described in the claims and the equivalents thereof.

In each of the embodiments and each of the modified examples described above, description has been provided on an example in which the spread plate 30 is attached from above the mouthpiece 20. However, not limited thereto, the spread plate 30 may be directly attached to the upper dentition portion 2.

Further, regarding the materials and shapes of the mouthpiece 20, the spread plate 30, and the like, any materials and shapes may be adopted as long as being capable of being attached into the oral cavity 1 and having the same function. Further, the shape of the locked portion does not have to be a protruding shape, and may be formed in an appropriate shape. Similarly, the shape of the locking portion does not have to be a recessed shape, and may be formed in an appropriate shape.

Further, each of the embodiments and the modified examples described above can be applied to an overlay type of a slow spread appliance.

Further, in each of the embodiments and modifications described above, description has been provided on an example in which the mouthpiece 20 is attached to cover the front teeth 3 and the molars 4. However, it is possible to be configured to cover only the molars 4.

What is claimed is:

1. An orthodontic appliance, comprising:
    right and left plate portions formed to be fitted to a shape in an oral cavity; and
    a spreading unit arranged between the right and left plate portions and configured to spread location of upper molars by spreading the right and left plate portions,
    wherein each of the right and left plate portions includes
        a plate body portion provided on a side of upper molars,
        an engagement portion extending from the plate body portion to a position facing a vicinity of upper front teeth,
        the engagement portion includes an engagement surface to engage with the lower front teeth when an upper dentition portion and a lower dentition portion are engaged with each other,
        the engagement surface,
            is formed flat in a state of being attached into the oral cavity, and
            is formed in a band shape whose front-to-back width is a predetermined width, and
        the engagement surface, on a leading end side with respect to the upper front teeth, is formed in a smooth arc shape without irregularities.

2. The orthodontic appliance according to claim 1, wherein the engagement surface is formed as an inclined flat surface.

3. The orthodontic appliance according to claim 2, wherein the engagement portion is provided with a reinforcement resin having higher strength than the plate body portion.

4. The orthodontic appliance according to claim 1, wherein the engagement portion is formed thicker than the plate body portion.

5. The orthodontic appliance according to claim 2, wherein the engagement portion is formed thicker than the plate body portion.

6. The orthodontic appliance according to claim 1, wherein the engagement portion is provided with a reinforcement resin having higher strength than the plate body portion.

7. The orthodontic appliance according to claim 4, wherein the engagement portion is provided with a reinforcement resin having higher strength than the plate body portion.

8. The orthodontic appliance according to claim 5, wherein the engagement portion is provided with a reinforcement resin having higher strength than the plate body portion.

* * * * *